Aug. 13, 1963    D. MORROW    3,100,614
INFLIGHT REFUELING SYSTEM
Filed June 14, 1962    8 Sheets-Sheet 1

INVENTOR
DAVID MORROW

BY *Claude Funkhouser*

ATTORNEY

Aug. 13, 1963
D. MORROW
3,100,614
INFLIGHT REFUELING SYSTEM
Filed June 14, 1962
8 Sheets-Sheet 2
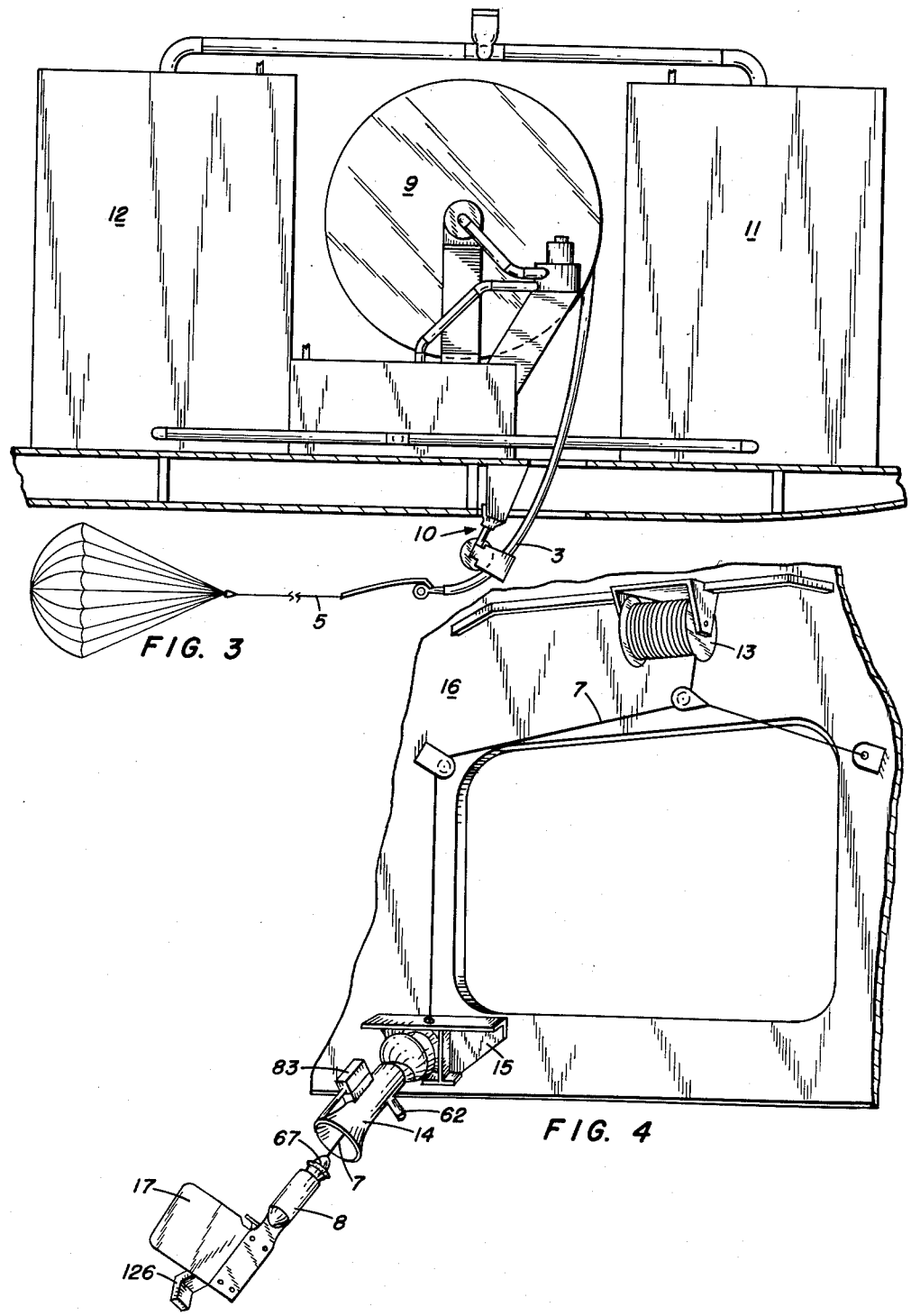

Aug. 13, 1963  D. MORROW  3,100,614
INFLIGHT REFUELING SYSTEM
Filed June 14, 1962  8 Sheets-Sheet 4
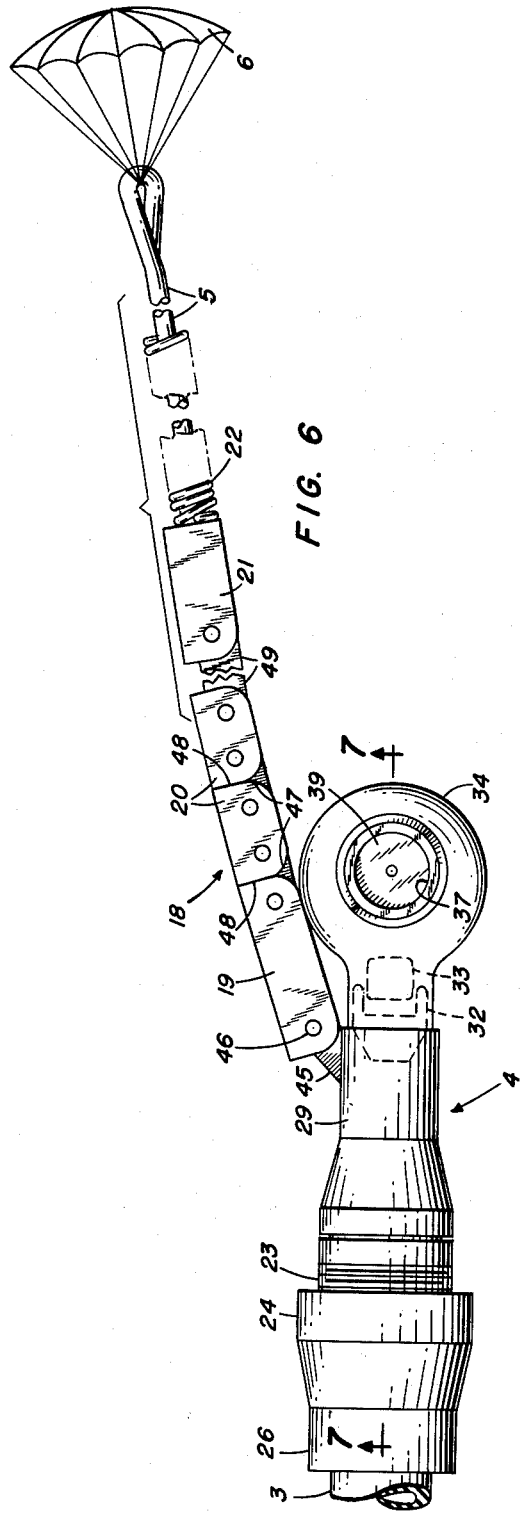
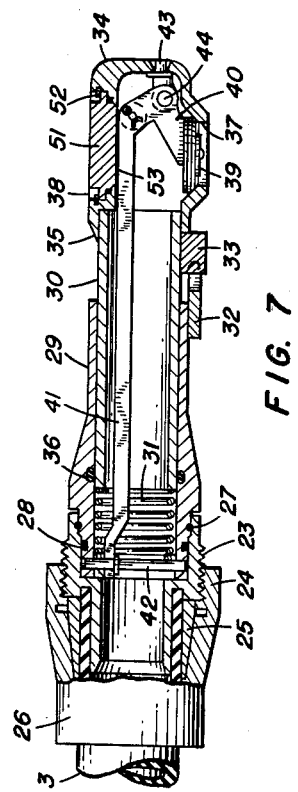

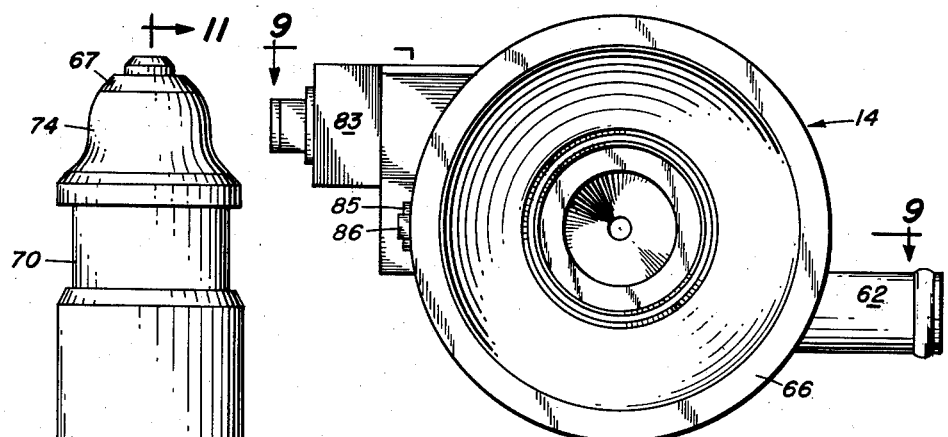
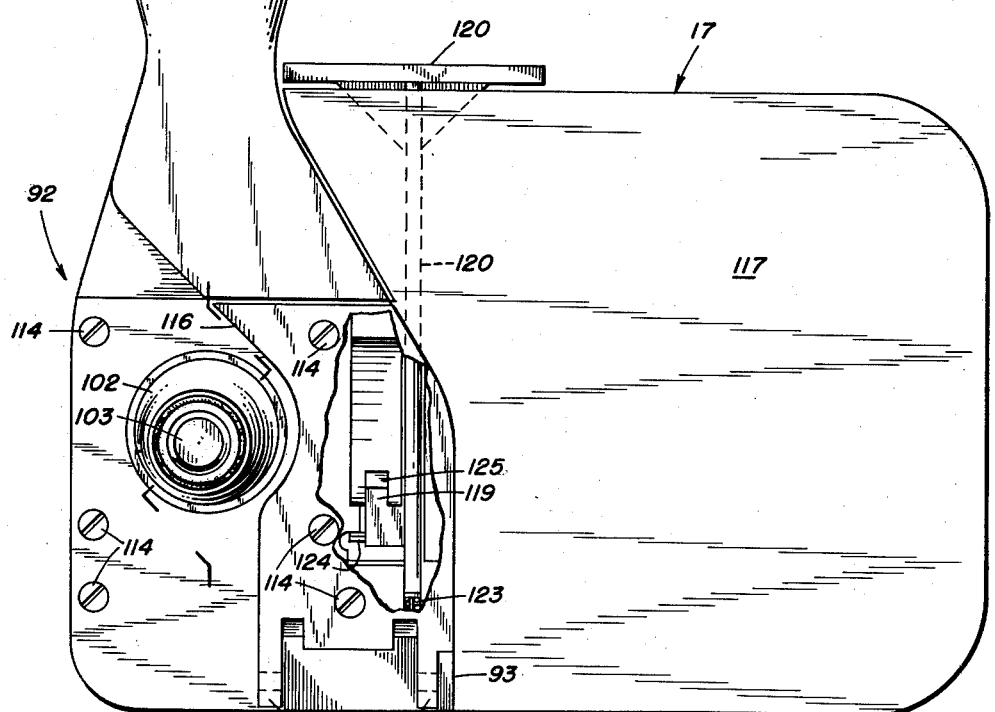

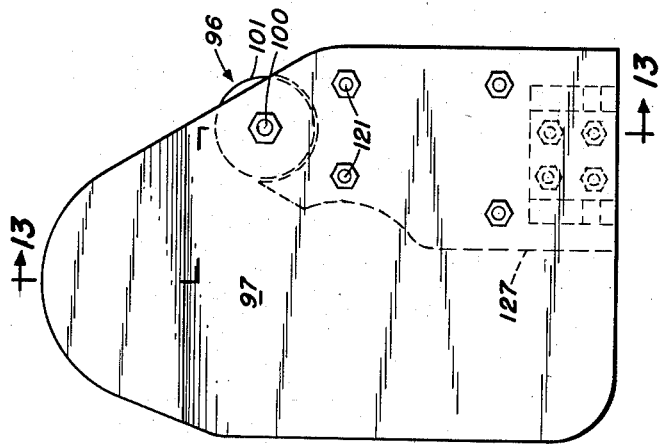
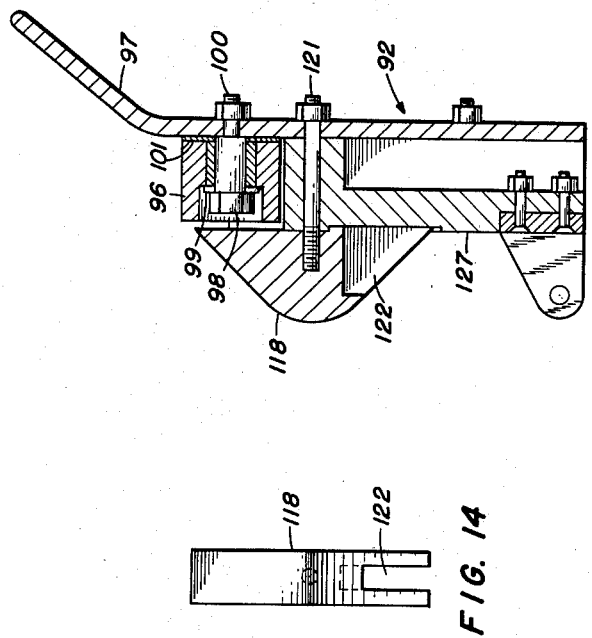

_United States Patent Office_

3,100,614
Patented Aug. 13, 1963

3,100,614
INFLIGHT REFUELING SYSTEM
David Morrow, Silver Spring, Md., assignor, by mesne assignments, to the United States of America as represented by the Secretary of the Navy
Filed June 14, 1962, Ser. No. 202,636
8 Claims. (Cl. 244—135)

This invention relates to a looped hose and grapnel system for refueling aircraft in flight.

In order to accomplish inflight refueling of aircraft, several problems must be overcome. One of the most difficult of these problems is that of connecting the fuel transfer hose from the supply aircraft to the receiving aircraft in such a manner as to materially reduce the danger of overstressing the transfer hose while simultaneously minimizing fuel loss during coupling and uncoupling. Several inflight refueling systems have been proposed to solve this problem. One such system provides a manual connection in the receiving aircraft so that the fuel transfer hose may be drawn into or closely adjacent the receiving aircraft and coupled thereto manually. This manual system has several distinct disadvantages. In order to accomplish manual connection the aircraft must carry personnel specifically for this purpose who otherwise could be performing other functions or could be eliminated altogether, providing less weight and, thus, allow the aircraft to carry more fuel. Further, an opening must be provided in the receiving aircraft either to bring the transfer hose nozzle into the aircraft or to allow aircraft personnel to make the connection outside the aircraft. Either of these alternatives are obviously unsatisfactory. Dependance on personnel to connect and disconnect the transfer hose provides a possible source of human error that it is desirable to eliminate. Further, such manual means of connection presents a danger to the personnel involved. A proposal has been made to eliminate manual connections by an automatic coupling and uncoupling assembly connected solely to the receiving aircraft. Such a solution is unsatisfactory, however, because it involves a complex assembly which endangers the equilibrium of the receiving aircraft and is difficult to assemble and maintain.

Therefore, it is an object of this invention to provide a looped hose and grapnel system for inflight refueling of aircraft having a means for automatically coupling the fuel transfer hose into the receiving aircraft.

It is another object of this invention to provide a means for automatically coupling a fuel transfer hose into a receiving aircraft without the need for manual manipulation of the parts.

It is another object of this invention to provide a system for automatically coupling a fuel transfer hose from a supply aircraft to a receiving aircraft which automatically compensates for excess stress in the transfer hose.

It is a further object of this invention to provide a system for automatically coupling a fuel transfer hose from a supply aircraft to a receiving aircraft which automatically compensates for excess stress in the transfer hose and which has a means for rapidly coupling and uncoupling the transfer hose nozzle from the receiving assembly with a minimum of fuel loss.

It is a further object of this invention to provide a system for automatically coupling a fuel transfer hose from a supply aircraft to a receiving aircraft that is uncomplicated and easy to maintain.

Various other objects and advantages will appear from the following description of one embodiment of the invention, and the novel features will be particularly pointed out hereinafter in connection with the appended claims.

Other objects and many of the attendant advantages of this invention will be readily appreciated as the same becomes better understood by reference to the following detailed description when considered with the accompanying drawings wherein:

FIG. 3 is a side view of the fuel transfer system connected to the supply aircraft;

FIG. 4 is a perspective view of the fuel receiving system connected to the receiving aircraft;

FIG. 6 is a side elevation showing the fuel transfer hose nozzle, one-way chain, lead line and air drag;

FIG. 7 is a top section view of the fuel transfer nozzle taken along line 7—7 of FIG. 6;

FIG. 8 is a top view of the receiver assembly;

FIG. 10 is a plan view of the grapnel with one part of the hose engaging member removed and the other part partially broken away to expose the latch mechanism;

FIG. 12 is a plan view of the hose engaging mechanism of the grapnel;

FIG. 13 is a side elevation of the hose engaging mechanism of the grapnel assembly taken along line 13—13 of FIG. 12;

FIG. 14 is a front view of the striker plate of the latch assembly shown in FIG. 13.

Figure 1:
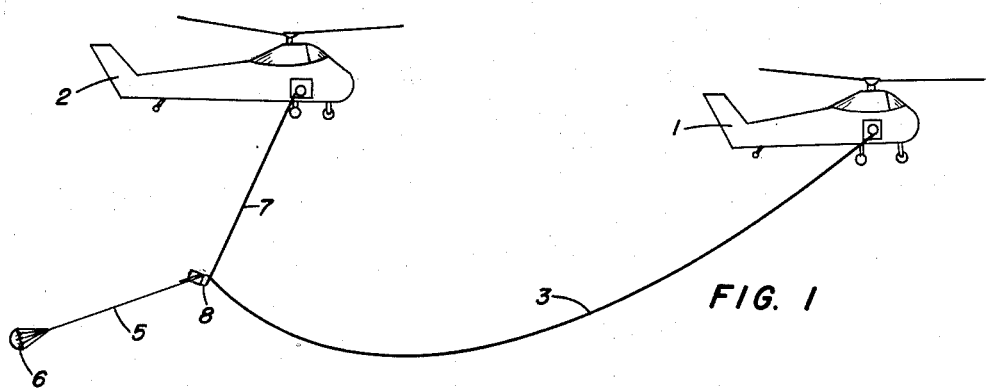
FIG. 1 is a perspective view of the looped hose and grapnel refueling system in operation with the grapnel in contact with the fuel hose nozzle.

The invention will be more fully understood by the following detailed description with reference to the accompanying drawings wherein:

FIG. 1 shows a supply aircraft (such as a helicopter) 1, and a receiving aircraft (such as a second helicopter) 2 located behind the supply aircraft 1. A fuel transfer hose 3 is connected to and trails behind the supply aircraft 1 and has a transfer hose nozzle 4 (both shown in FIG. 6) connected to one end with a lead line 5 and air drag 6 connected to the nozzle 4. A cable 7 and grapnel 8 (better shown in FIG. 4) extend downwardly from the receiving aircraft 2 to engage the fuel transfer hose 3 in a manner to be hereinafter described.

Figure 2:
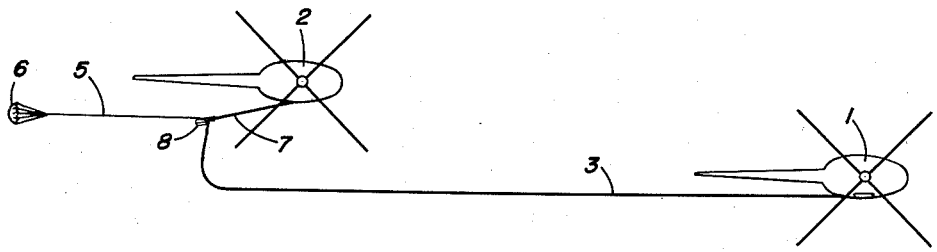
FIG. 2 is a view of the refueling system in operation taken from above showing the relative position of the supply aircraft, the receiving aircraft and the looped hose.

FIG. 2 shows the relative positions of the supply aircraft 1 and receiving aircraft 2 when fuel transfer is being made. It should be noted that the fuel transfer hose 3 forms a loop between the supply aircraft 1 and receiving aircraft 2 when fuel is being transferred. The receiving aircraft 2 is located slightly to the left of the supply aircraft 1, when looking in a direction from receiving aircraft 2 toward supply aircraft 1, as well as behind the supply aircraft 1 as shown in FIG. 1.

The general operation of the device is as follows:

The airborne supply aircraft 1 trails or "displays" the full length of the fuel transfer hose 3, nozzle 4, lead line 5 and air drag 6. The airborne receiving aircraft 2 assumes a position behind, slightly below and to the right of the supply aircraft 1 and lowers its cable 7 and grapnel 8 until it has reached its maximum length. The receiving helicopter 2 then moves from right to left so that the grapnel 8 will contact the lead line 5 connected to the transfer hose nozzle 4. When the grapnel 8 has engaged the lead line 5 as will be hereinafter more particularly described the cable 7 and grapnel 8 are raised so that the air drag 6 causes the lead line 5 to slide in the grapnel 8 until the nozzle 4 has engaged the self-sealing valve 102 in the grapnel 8 in a manner to be hereinafter more specifically described.

The engagement of the nozzle 4 with the self-sealing valve 102 in the grapnel 8 depends on a balance between the rearward force of the air drag 6 and the forward force of the transfer hose 3 which forms a loop, as shown in FIG. 2, between the supply aircraft 1 and receiving aircraft 2. This balance system insures that the maximum tensile strength of the transfer hose will not be exceeded since the nozzle 4 will automatically uncouple from the grapnel 7 before such a point is reached. Since the lead line 5 will automatically slide in the grapnel 8, the transfer system will be in a position to automatically recouple the nozzle 4 to the self-sealing valve 102 when the receiving helicopter position is adjusted relative to the supply helicopter's position so that the rearward force of the air drag 6 is greater than the forward force of the fuel transfer hose 3. The air drag 6 also serves as a stabilizer for the transfer hose 3 to minimize erratic movement of the transfer hose 3 during the refueling operation.

The operation of that part of the transfer system which is connected to the supply aircraft is as shown in FIG. 3 and is achieved by means of a hose reel 9 and depression boom 10. The supply tanks may be located, as shown in FIG. 3, on either side of the hose reel 9 so that fuel may be taken alternatively from the forward tank 11 and the aft tank 12 to maintain balance of the aircraft. When it is desired to place the fuel transfer system in operating position the hose reel 9 is released by any suitable means, not shown, so that the air drag 6 causes the transfer hose 3 to pay out off of the hose reel 9, over the depression boom 10 and behind the aircraft until the full length of the transfer hose 3 is "displayed." The air drag 6 serves to stabilize the transfer hose 3 in trailing position for engagement by the grapnel 8.

When the transfer hose 3 has been fully displayed, a receiving aircraft 2 is positioned, and the cable 7 and grapnel 8 are lowered to engage the lead line 5 and transfer hose nozzle 4. The movement of the cable 7 and the grapnel 8 may be achieved by a hoist such as the personnel hoist 13 of the receiving aircraft 2 as shown in FIG. 4. The cable 7 is attached at one end to grapnel 8 and at the other end to hoist 13. A coupling assembly 14 is attached to the receiving aircraft 2 by means such as a mounting bracket 15 and has a bell mouth for receiving the grapnel 8 in a manner to be hereinafter more particularly described. As will be seen by reference to FIG. 4, cable 7 extends from the top of the grapnel 8 through a coupling assembly 14 and is connected to hoist 13 by means such as the pulley system designated generally as 16. When lowering of the cable 7 and grapnel 8 is desired, the hoist 13 is actuated by any suitable means such as a motor, not shown, so that cable 7 pays out over the pulley system 16, through coupling assembly 14, and grapnel 8 is lowered until the maximum length of cable 7 is reached. The grapnel 8 is then ready to engage lead line 5 as hereinbefore described with reference to FIGS. 1 and 2. The grapnel 8 is stabilized and maintained in its proper orientation by fin 17, shown in FIG. 4.

Figure 5:
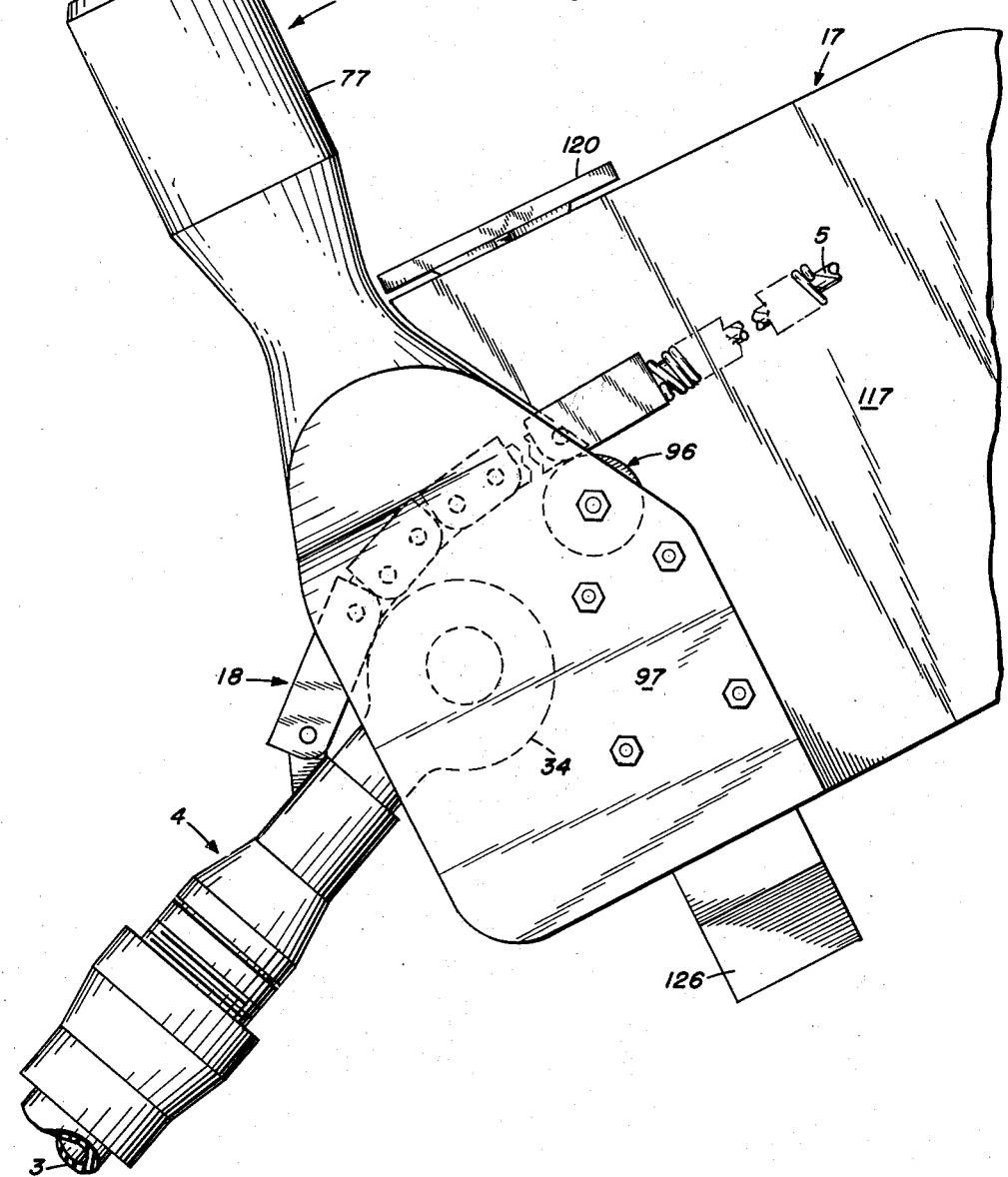
FIG. 5 is a side elevation showing the grapnel operably connected to the fuel nozzle.

When the grapnel 8 has engaged lead line 5 as hereinbefore described with reference to FIGS. 1 and 2 the direction of rotation of hoist 13 is reversed and the grapnel 8 and lead line 5 move upward toward the receiving aircraft 2. Since the grapnel 8 and cable 7 are trailing behind receiving aircraft 2 the upward movement of cable 7 causes grapnel 8 to move forward as well as upward, and the rearward force of air drag 6 causes lead line 5 to slide rearward in grapnel 8 until the grapnel 8 engages a one way chain 18, to be more particularly described, and transfer hose nozzle 4 engages one way valve 102 as shown in FIG. 5. Proper orientation of nozzle 4 to engage one way valve 102 is achieved by one way chain 18 in a unique manner to be hereinafter more particularly described.

A clearer understanding of the fuel transfer assembly which is connected to the supply aircraft can be obtained by reference to FIGS. 6 and 7. The transfer hose nozzle is referred to generally by reference numeral 4. Nozzle 4 is attached to transfer hose 3 by a threaded sleeve 23 which screws into a nut 24 connected to hose 3 by means of a wedge ring 25 and resilient spring 26. Threaded sleeve 23 is connected to hose nozzle 4 by means of a shear wire 27 and a fluid tight seal is achieved by O-ring 28. Outer sleeve 29 houses inner sleeve 30 which is slidable within outer sleeve 29 and is spring biased to the right by coil spring 31. Inner sleeve 30 is maintained against rotation about its longitudinal axis by U-pin 32 and stop 33. Nozzle head 34 is fixedly attached to inner sleeve 30 by means such as welded fillets 35. Outer sleeve 29 maintains a fluid tight connection with inner sleeve 30 by means of an O-ring 36. Nozzle head 34 has a first opening 37 in a side thereof and a second opening 38 opposite the first opening 37. The first opening 37 is sealed closed when nozzle head 34 is extended its maximum distance to the right by valve cover 39 which is actuated by bell crank 40 connected to actuating rod 41. Actuating rod 41 is fixedly connected to the bottom of outer sleeve 29 by any suitable means such as circular pin 42 so that impedance to fluid flow by actuating rod 41 and its connector 42 is minimized. Transfer of fluid from transfer hose 3 through hose nozzle 4 to the self sealing valve 102 is achieved as follows: After grapnel 8 has engaged lead line 5 and one way chain 18 has properly oriented hose nozzle 4 so that nozzle valve 37 may engage self sealing valve 102 in grapnel 8 in a fluid tight connection, the nozzle 4 is pulled into connection with self sealing valve 102 in grapnel 8 by the force of air drag 6 as shown in FIG. 5. When receiving aircraft 2 is in proper position relative to supply aircraft 1 the force of air drag 6 forces nozzle head 34 and inner sleeve 30 to the left against the force of coil spring 31 while valve actuating rod remains fixed. Since bell crank 40 is pivotally connected to nozzle head 34 by means such as flathead pin 43 and pivot pin 44, bell crank 40 pivots upward moving valve cover 39 upward from valve opening 37 to allow fluid flow from valve opening 37 into self sealing valve 102 in grapnel 8. If for any reason the forward force of hose 3 becomes greater than the rearward force of air drag 6, hose nozzle 4 is disengaged from grapnel 8 and valve opening 37 is immediately sealed by valve cover 39 due to movement of inner sleeve 30 to the right under the force of bias spring 31.

A one-way chain generally designated by reference numeral 18, shown in FIG. 6, is movably connected to outer sleeve 29 by means such as clevis 45 and pivot pin 46 so that it will rest tangentially on hose nozzle 4. One-way chain 18 comprises anchor link 19, as many center links 20 as are necessary for the desired length, and lead link 21. The links of one-way chain 18 are designed so that the chain will bend in only one direction, toward the hose nozzle 4, and will form a arc of a circle when bent away from the hose nozzle 4 or pulled taut. This is achieved by forming a bevel 47 on one side of each end of each link and a slightly outward taper 48 on the other. The center links are connected together by flat links 49 such as that shown connecting the center links to the lead link 21. Lead line 5 is connected to lead link 21 by a sleeve 50 and a resilient spring 22 which serves to strengthen the connection. The one-way chain 18 serves to maintain hose nozzle 4 in proper orientation relative to self-sealing valve 102 in grapnel 8. The manner in which this orientation is achieved may be seen by reference to FIG. 5. As shown, the hose nozzle valve 4 is properly oriented, but if the one-way chain 18 entered the grapnel 8 turned over so that the circular arc opened upward, the nozzle 4 would not engage the self sealing valve 102 in grapnel 8. However, it should be noted that such a position of the chain is inherently unstable, and when force is excited on one end of the chain by air drag 6 and on the other end by hose 3 and the chain is supported underneath by grapnel 8, it will automatically flip over and the nozzle valve opening 37 will then be in position to engage self-sealing valve 102.

The opening 38 in nozzle head 34 opposite valve opening 37 is placed there merely for versatility in the nozzle head so that opening 38 may be used as a valve opening rather than valve opening 37. In the embodiment shown, opening 38 is closed in a fluid tight manner by plug 51, retaining ring 52 and O-ring 53.

Figure 9:
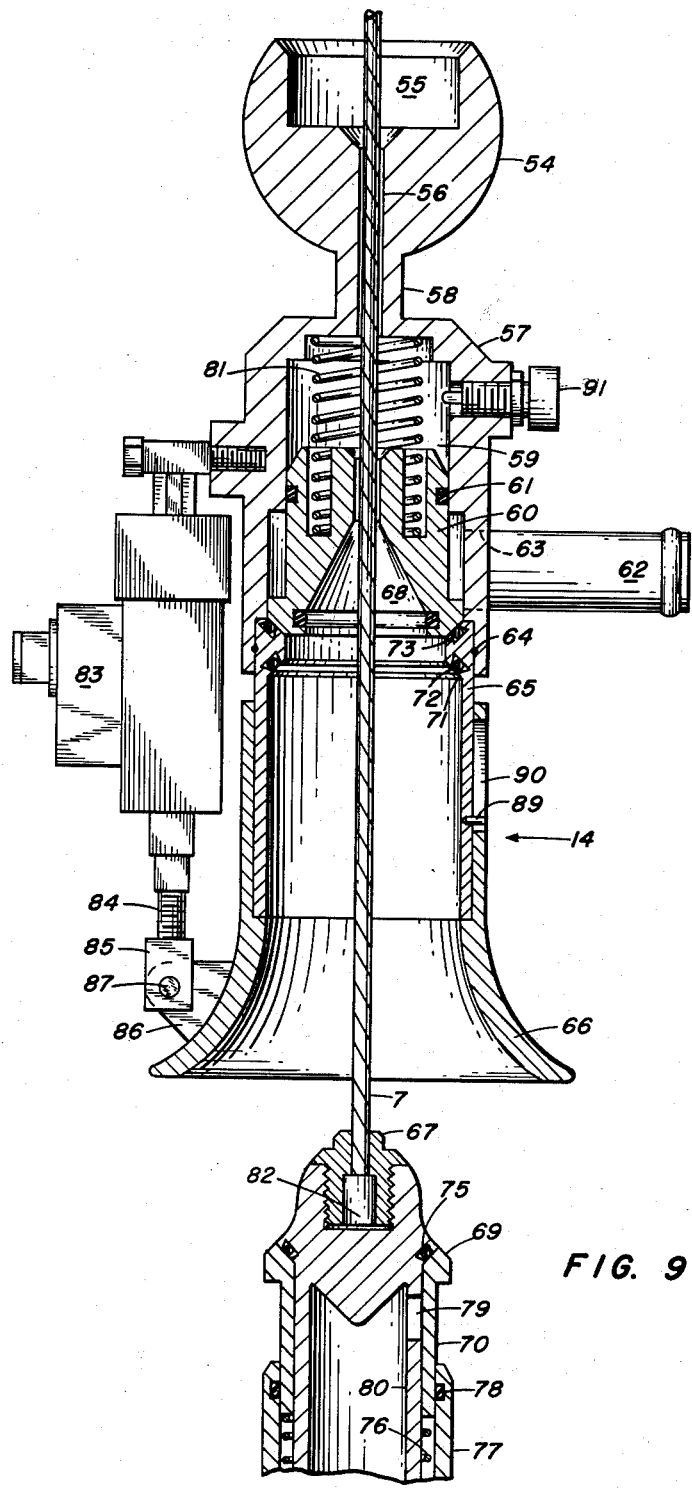
FIG. 9 is a partial side section elevation taken along line 9—9 of FIG. 8 showing the operable connection of the receiver coupling, the grapnel and the hoist cable.

A clearer understanding of the receiver assembly can be had by reference to FIGS. 8-14. FIG. 8 is a top view of the receiver coupling assembly 14, and FIG. 9 is a plan view of the coupling assembly 14 and part of the grapnel 8 to show the cooperation of the coupling assembly 14, the grapnel 8, and cable 7. The coupling assembly is attached to mounting bracket 15 on receiving aircraft 2, as shown in FIG. 4, by ball joint 54, having a cavity 55 and hole 56 therein, centered about its longitudinal axis, for receiving cable 7. Ball joint 54 is attached to the coupling assembly support 57 by a neck such as element 58 shown in FIG. 9. Support 57 has a hollow cylindrical cavity 59 therein symmetrical about its longitudinal axis. A spring biased valve closure member 60 is located within the support and forms a fluid tight connection therewith by means of O-ring 61. Fuel exit nozzle 62 is connected to a fluid exit port 63 located in the side of coupling support 57. Attached to the bottom of coupling support 57 by means of shear wire 64 are guide sleeve 65 and bell mouth 66 which serve to guide grapnel 8 into coupling assembly 14. Upon entering coupling assembly 14, grapnel nose piece 67 is guided into the conical cavity 68, and bevel shoulder 69 on grapnel sleeve slide 70 engages bevel lip 71 on guide sleeve 65 and forms a fluid tight seal with O-ring 72. O-ring 73 forms a fluid tight seal with the bevelled shoulder of valve enclosure member 60. Prior to engaging bevel shoulder 71, bevel 69 on grapnel sleeve slide 70 forms a fluid tight seal with grapnel head 74 by means of O-ring 75. Spring 76 presses sleeve slide 70 into fluid tight engagement with O-ring 75. Sliding sleeve 70 forms a fluid tight connection with grapnel body 77 by means of O-ring 78. Sliding sleeve 70 forms a fluid tight cover for fluid exit port 79 in grapnel sleeve 80. When grapnel head 74 is pulled further into coupling assembly 14 after bevel shoulder 69 has engaged O-ring 72, sliding sleeve 70 remains stationary, and fuel exit port 79 is opened. Simultaneously, valve closure member 60 is moved upward against the force of bias spring 81 to open fluid exit nozzle 62 and establish fluid transfer from grapnel sleeve 80, through fuel exit port 79, through fuel exit port 63 and outward through fuel exit nozzle 62.

Nose piece 67 may be attached to cable 7 by any suitable means such as by a swage ball 82 as shown in FIG. 9.

Member 83 is a reversible electric motor or other similar power device for moving bell mouth 66 to actuate grapnel latch releasing handle 120, shown in FIG. 10. Motor 83 drives a threaded actuator 84 to move a rod 85 connected to bell mouth 66 by clevis 86 and pin 87. Bell mouth 66 slides on guide sleeve 65 within the limits established by pin 89 and slot 90 to actuate grapnel latch releasing handle 120 as hereinafter described. The fuel transfer connection is achieved between coupling assembly 14 and grapnel 8 automatically with no manual aid being necessary as shown. Hoist 13 is stopped when nose piece is fully engaged in the coupling assembly 14 by valve closure member contacting position switch 91 and deactivating the power source of the hoist. No hoist power source is shown since the hoist may be the general personnel hoist of the aircraft and the power source that ordinarily is used to actuate the hoist.

Figure 11:
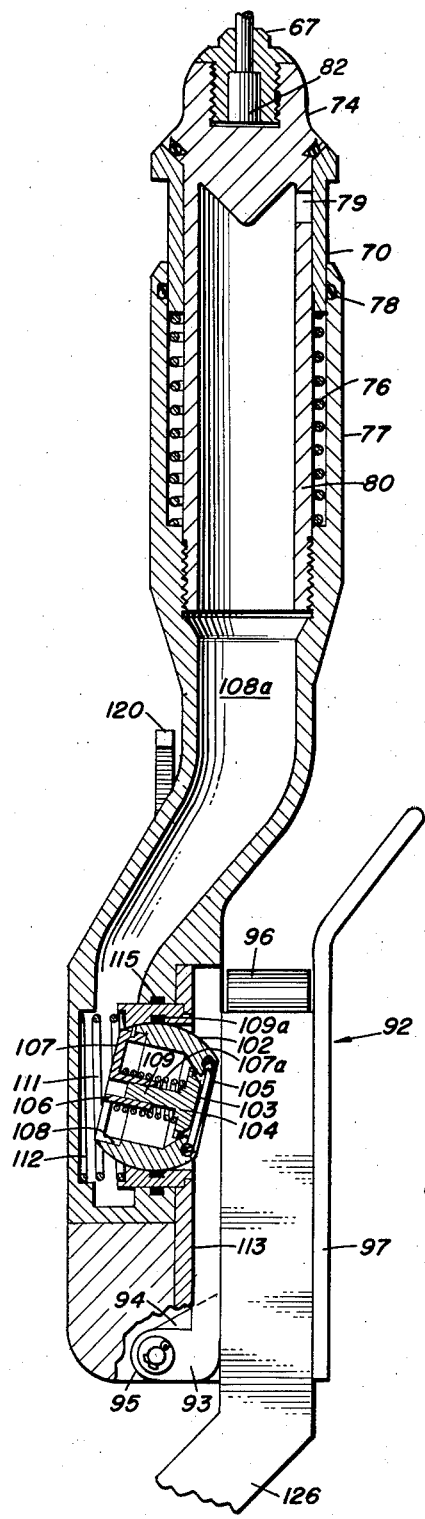
FIG. 11 is a side elevation of the grapnel taken along line 11—11 of FIG. 10.

Attached to grapnel body 77 is a hose engaging member designated generally by reference numeral 92 and shown in FIGS. 10 and 11. Hose engaging member 92 is connected to grapnel body 77 by a hinge 93 having a hinge plate 94 and guide members 95. When the grapnel 8 is in operating position the hose engaging member 92 is closed as shown in FIG. 11 and is maintained closed by a latching mechanism to be hereinafter described. When the hose engaging member 92 is in operating condition cylindrical washer 96 engages lead line 5 which slides due to the force of air drag 6 over the washer 96. Washer 96, as shown in FIGS. 11 and 13, is attached to face plate 97 of hose engaging mechanism 92 by a stud 98, cylindrical washer 99, nut 100, and circular washer 101. Face plate 97 curves outward at its top to facilitate engaging lead line 5. Grapnel 8 supports a self-sealing valve 102 which forms a ball swivel having a hollow interior and a circular opening 103 facing generally toward the hose engaging mechanism 92. Self-sealing valve 102 is closed by spring biased closure member 104 and O-ring 105. Closure member 104 is supported within self-sealing valve 102 by a cylindrical sleeve 106 connected by an arm 107 and ring 108 to valve member 102 and fixed thereto by spring pins 110 located around the circumference of ring 108. Shaft 109 of valve closure member 104 is slidable within cylindrical sleeve 106 and a coil spring 107a urges valve closure member 103 toward O-ring 105 to close the valve. When fuel pressure overcomes the force of spring 107a the valve closure member 103 opens and fuel flows into the valve 103 and thence into fuel passage 108a. Valve member 102 is supported in a valve housing 109a in a fluid tight connection by means of O-ring 110. Valve housing 109a is formed as a hollow cylinder having its inner surface semi-spherical to engage valve member 102. Valve member 102 is free to move, within valve housing 109a to a degree limited by the space between the valve member 102 and the rear wall of grapnel body 77, so that the hose nozzle will more readily form a fluid tight seal with O-ring 105. Valve housing 109a is supported within grapnel body 77 by a coil spring 111 which is seated in a recessed portion 112 of grapnel body 77, and is biased against a guide plate 113 fixedly attached to grapnel body 77 by means such as studs 114. A fluid tight seal is formed between grapnel body 77 and valve housing 109a by O-ring 115. Guide plate 113 is fixedly attached to grapnel body 77 as previously described and has a raised portion 116 (shown in FIG. 10) located thereon to serve as a buttress for hose nozzle head 34 when entering the grapnel assembly. The hose nozzle head 34 contacts raised portion 116 and is guided thereby until nozzle opening 37 seats against O-ring 105 in valve opening 103 to form a fluid transfer passage. When transfer nozzle head 34 abuts raised portion 116 on grapnel 8 and the valve opening 37 in the nozzle head 34 seats in valve 102 the force of air drag 6 causes nozzle 4 valve closure member 39 to open and fuel pressure to bear against the grapnel valve closure member 107 so that the valve opens and fuel flows into the grapnel fuel passage 108a. A fin 17, shown in FIG. 10, may be attached to grapnel body 77 to provide proper orientation of the grapnel 8 in flight.

The latching mechanism for maintaining hose engaging member 92 closed when fuel transfer is being made and for releasing the nozzle when transfer is complete is shown in FIGS. 10, 13 and 14. The latching mechanism comprises a striker plate 118, a latch rod 119, and an actuating T-bar 120. Striker plate 118 is fixedly attached to hose engaging nozzle guide 127 by means of such as a stud 121, and has a slot 122 for receiving latch pin 119. The striker plate is generally parabolic in shape so that it will present no obstacle to the nozzle when released at the end of a fuel transfer operation. Latch pin 119 is biased upward by latch spring 123, and its upward travel is limited by dowel pin 124. The portion of latch pin 119 that contacts striker plate 118 is beveled as shown at 125 in FIG. 10 so that it will slide along the generally parabolic surface of striker plate 118 and be depressed thereby until the beveled edge 125 enters slot 122 and is urged upward by latch spring 123 to close hose engaging mechanism 92. The closure force necessary to urge striker plate 118 toward latch pin 119 may be achieved by any suitable means such as a U spring or a counterweight 126 as shown in FIG. 11. When fuel transfer is complete and release of hose nozzle head 34 from the grapnel 8 is desired, member 83, shown in FIG. 9, is actuated, and bell mouth 66 is moved downward to engage latch actuating T-bar 120. Bell mouth 66 forces actuating T-bar 120 downward which in turn releases latch pin 119 from striker plate 118 and the hose engaging mechanism pivots about pivot pin 95 and air drag 6 pulls nozzle head 34 away from grapnel body 77 and the hose 3 is pulled free of the receiver assembly to again trail behind supply aircraft 1. When bell mouth 66 reaches its lowermost limit, its movement is reversed and it is raised back into its normal operating position. When the downward pressure is released from T-bar 120 and hose 3 has moved away from hose engaging assembly 92, counterweight 126 causes striker plate 118 to re-engage latch pin 119, and the system is ready to begin another refueling cycle.

FIGURE 12 is a plan view of hose engaging mechanism 92 showing the relative position of face plate 97, cylindrical washer 101, and nozzle guide 116.

Obviously many modifications and variations of the present invention are possible in the light of the above teachings. It is, therefore, to be understood that within the scope of the appended claims the invention may be practiced otherwise than as specifically described.

What is claimed is:

1. In a system for transferring fuel from a supply aircraft to a receiving aircraft, the combination comprising:
    a receiving tank located on the receiving aircraft for receiving fuel from the supply aircraft;
    fuel transferring means connected to said supply aircraft for transferring fuel from a tank on said supply aircraft to said receiving tank on said receiving aircraft, said fuel transferring means having a hose with a nozzle, a stabilizer and a connecting means to connect said hose and nozzle to said stabilizer;
    receiving means connected to said receiving tank for transferring fuel from said fuel transferring means to said receiving tank, said receiving means having a coupler movably attached to said receiving aircraft and a grapnel extendable from said coupler engageable with the hose and nozzle and connecting the nozzle to the coupler in a fluid tight relationship whereby fuel is transferred from the supply aircraft to the receiving aircraft; and
    extension means connected to said grapnel for raising and lowering the grapnel so that the grapnel may be lowered to engage the connecting means and raised to make a fluid tight connection with the coupler.

2. In a system for transferring fuel from a supply aircraft to a receiving aircraft, the combination comprising:
    a receiving tank located on said receiving aircraft for receiving fuel from said supply aircraft;
    fuel transferring means connected to said supply aircraft for transferring fuel from a tank on said supply aircraft to said receiving tank on said receiving aircraft, said fuel transferring means having a hose with a nozzle, a stabilizer and a connecting means to connect said hose and nozzle to said stabilizer; and
    receiving means connected to said receiving tank for transferring fuel from said fuel transferring means to said receiving tank, said receiving means having a coupler movably attached to said receiving aircraft and a grapnel extendable from said coupler adapted to engage said hose and nozzle and to connect said nozzle to said coupler in a fluid tight relationship whereby fuel is transferred from said supply aircraft to said receiving aircraft;
    extension means connected to said grapnel, said extension means comprising a cable and hoist for raising and lowering the grapnel so that the grapnel may be lowered to engage the connecting means and raised to make a fluid tight connection with the coupler.

3. In a looped hose and grapnel system for inflight refueling of aircraft, the combination comprising:
    a supply means and a receiving means, said supply means having a fuel tank and a fuel transfer hose extendably connected thereto at one end, said fuel transfer hose having a nozzle connected to the end opposite the end which is connected to the fuel tank;
    a nozzle orienting means connected to said nozzle;
    a stabilizer connected to said orienting means by a lead line, said fuel receiving means having a receiving tank and a fuel transfer means connected thereto, said fuel transfer means having a coupler, a grapnel extendably connected to said coupler adapted to engage said coupler in a fluid-tight relationship;
    an extension means connected to said grapnel for raising and lowering said grapnel so that said grapnel may be lowered to engage said nozzle on said fuel transfer means and raised into fluid tight relationship with said coupler;
    a fluid passage in said grapnel;
    a self-sealing valve engageable with said nozzle on the fuel transfer hose and in fluid-tight relationship therewith whereby fluid passes from the nozzle into said fluid passage;
    and line engaging means on the grapnel for engaging said lead line connecting the nozzle to the stabilizer.

4. In a looped hose and grapnel system for inflight refueling of aircraft, the combination comprising:
    a supply means and a receiving means, said supply means having a fuel tank and a fuel transfer hose extendably connected thereto at one end, said fuel transfer hose having a nozzle connected to the end opposite the end which is connected to the fuel tank;
    a nozzle orienting means connected to said nozzle;
    a stabilizer connected to said orienting means by a lead line, said fuel receiving means having a receiving tank and a fuel transfer means connected thereto, said fuel transfer means having a coupler, a grapnel extendably connected to said coupler and adapted to engage said coupler in a fluid-tight relationship;
    an extension means connected to said grapnel for raising and lowering said grapnel so that said grapnel may be lowered to engage said nozzle on said fuel transfer means and raise into fluid tight relationship with said coupler;
    line engaging means on said grapnel; and
    means on the line engaging means for enabling said lead line to slide in the line engaging means whereby said nozzle orienting means will orient the nozzle in the grapnel.

5. In a looped hose and grapnel system for inflight refueling of aircraft, the combination comprising:
    a supply means and a receiving means, said supply means having a fuel tank and a fuel transfer hose extendably connected thereto at one end, said fuel transfer hose having a nozzle connected to the end opposite the end which is connected to the fuel tank;
    a nozzle orienting means connected to said nozzle, and a stabilizer connected to said orienting means by a lead line, said fuel receiving means having a receiving tank and a fuel transfer means connected thereto, said fuel transfer means having a coupler, a grapnel extendably connected to said coupler adapted to engage said coupler in a fluid-tight relationship;

an extension means connected to said grapnel for raising and lowering said grapnel so that said grapnel may be lowered to engage said nozzle on said fuel transfer means and raised into fluid-tight relationship with said coupler, said nozzle orienting means including a one-way chain bendable only in a direction toward the nozzle and forming an arc when under stress to thereby properly orient the nozzle in the grapnel.

6. In a looped hose and grapnel system for inflight refueling of aircraft, the combination comprising:
   a supply means and a receiving means, said supply means having a fuel tank and a fuel transfer hose extendably connected thereto at one end, said fuel transfer hose having a nozzle connected to the end opposite the end which is connected to the fuel tank;
   a nozzle orienting means connected to said nozzle;
   a stabilizer connected to said orienting means by a lead line, said fuel receiving means having a receiving tank and a fuel transfer means connected thereto, said fuel transfer means having a coupler, a grapnel extendably connected to said coupler and having a self-sealing element adapted to engage said coupler in a fluid tight relationship;
   an extension means connected to said grapnel for raising and lowering said grapnel so that said grapnel may be lowered to engage said nozzle on said fuel transfer means and raised into fluid-tight relationship with said coupler;
   a valve disposed within said nozzle and valve actuating means within said valve for opening said valve only when the valve has engaged said self-sealing element in said grapnel in said fluid-tight relationship and for closing the valve when the valve is disengaged from the self-sealing element in the grapnel.

7. In a looped hose and grapnel system for inflight refueling of aircraft, the combination comprising:
   a supply means and a receiving means, said supply means having a fuel tank and a fuel transfer hose extendably connected thereto at one end, said fuel transfer hose having a nozzle connected to the end opposite the end which is connected to the fuel tank;
   a valve disposed within said nozzle;
   a nozzle orienting means connected to said nozzle;
   a stabilizer connected to said orienting means by a lead line, said fuel receiving means having a receiving tank and a fuel transfer means connected thereto, said fuel transfer means having a coupler, a grapnel extendably connected to said coupler and having a self sealing element adapted to engage said coupler in a fluid-tight relationship;
   an extension means connected to said grapnel for raising and lowering said grapnel so that said grapnel may be lowered to engage said nozzle on said fuel transfer means and raised into fluid-tight relationship with said coupler; and
   nozzle guide means in said grapnel adjacent said self sealing element for guiding the valve in the nozzle into said fluid-tight relationship with said self sealing valve.

8. In a looped hose and grapnel system for inflight refueling of aircraft, the combination comprising:
   a supply means and a receiving means, said supply means having a fuel tank and a fuel transfer hose extendably connected thereto at one end, said fuel transfer hose having a nozzle connected to the end opposite the end which is connected to the fuel tank;
   a nozzle orienting means connected to said nozzle;
   a stabilizer connected to said orienting means by a lead line, said fuel receiving means having a receiving tank and a fuel transfer means connected thereto, said fuel transfer means having a coupler;
   a grapnel extendably connected to said coupler adapted to engage said coupler in a fluid-tight relationship;
   an extension means connected to said grapnel for raising and lowering said grapnel so that said grapnel may be lowered to engage said nozzle on said fuel transfer means and raised into fluid-tight relationship with said coupler;
   a line engaging means on said grapnel for engaging said lead line connecting the nozzle to the stabilizer, said line engaging means comprising two parts rotatably connected together at one end by a hinge and having a latch means located in said parts for detachably connecting said parts whereby the nozzle may be disengaged from the grapnel.

References Cited in the file of this patent

UNITED STATES PATENTS

| | | |
|---|---|---|
| 1,806,834 | Ullendorff | May 26, 1931 |
| 1,848,372 | Moran | Mar. 8, 1932 |
| 2,166,575 | Atcherley | July 18, 1939 |
| 2,634,927 | Smith | Apr. 14, 1953 |
| 2,769,604 | Hudson | Nov. 6, 1956 |
| 2,973,163 | Goodlife | Feb. 28, 1961 |